United States Patent [19]

Vij et al.

[11] Patent Number: 4,653,047

[45] Date of Patent: Mar. 24, 1987

[54] COMMUNICATION SUBSYSTEM

[75] Inventors: Jitender K. Vij, Trumbull; John A. Yanosy, Jr., Stratford; Eugene P. Gerety, Wolcott, all of Conn.

[73] Assignee: ITT Corporation, New York, N.Y.

[21] Appl. No.: 705,464

[22] Filed: Feb. 25, 1985

[51] Int. Cl.$^4$ ........................................... H04Q 11/04
[52] U.S. Cl. ....................................... 370/58; 370/85
[58] Field of Search ..................... 370/85, 58, 110.1; 340/825.5

[56] References Cited

U.S. PATENT DOCUMENTS

| | | | |
|---|---|---|---|
| 4,373,183 | 2/1983 | Means et al. | 370/85 |
| 4,380,052 | 4/1983 | Shima | 370/85 |
| 4,451,881 | 5/1984 | Grice et al. | 370/85 |
| 4,543,642 | 9/1985 | Hansen | 370/85 |

Primary Examiner—Douglas W. Olms
Assistant Examiner—Kenneth I. Rokoff
Attorney, Agent, or Firm—Robert A. Hays; Peter C. Van Der Sluys

[57] ABSTRACT

A communication subsystem includes a plurality of peripheral interface devices, one or more network interface devices and, optionally, one or more gateway interface devices. Each and every interface device includes a uniform data transport controller that autonomously controls data traffic across the device associated therewith and executes all requisite communication protocol conversions.

14 Claims, 5 Drawing Figures

COMMUNICATION SUBSYSTEM

CROSS-REFERENCE TO RELATED APPLICATIONS

This application is related to one, or more, of the following U.S. patent applications: Ser. Nos. 670,682; 670,701 both filed on Nov. 13, 1984. Ser. Nos. 705,456; 705,457; 705,458; 705,459; 705,460; 705,461; 705,462; 705,463; 705,465 all filed on even date herewith. All of the above applications are assigned to the assignee hereof.

BACKGROUND OF THE INVENTION

The present invention generally relates to a communication subsystem and, in particular, relates to such a subsystem having a distributed masterless multi-microcomputer architecture.

The development of communication subsystems evolved as an alternative to central telephone exchanges to avoid the problems of bottlenecking and catastrophic failure of the entire system due to the failure of an element at the central exchange. These problems were exacerbated as non-voice or data systems became more prevalent since such data systems were also centrally based, i.e. by what is commonly known as a central processing unit (CPU). In fact, these problems became compounded due to the inherent characteristics of data communication. For example communication protocol coversions were required, more rapid path set-up and tear-down was required and adaptation for newer and/or different peripherals and/or services became a constant demand. Further, as a result of centralization, the growth of networks in response to an increase in subscribers and/or services became difficult, often requiring an expensive redesign of a substantial portion, if not all, of the system.

For the most part, the above problems were dissipated by the fully distributed ITT SYSTEM 12 digital exchange. In that design the path set up and tear down command and control functions were decentralized. The architecture essentially includes a digital switching network (DSN) having a plurality of terminal control elements (TCE) interconnected thereto and thereby. Each TCE includes the necessary means for path control between subscribers to different TCE's. Consequently, in the event of a failure in the DSN each TCE nevertheless provides full services to the subscribers thereto, and in the event of a failure in any TCE, the remaining TCEs and DSN provide full service to the subscriber thereto. In addition, the provision of alternate, or redundant paths and services can readily be provided and this further reduces any impact of any failure on the subscribers to a particular TCE.

Another significant advantage derived from a fully distributed network, such as the ITT SYSTEM 12 digital exchange, is that, by use of printed circuit board assemblies each TCE can be expanded in a modular fashion. In addition, the number of TCE's interconnected to a DSN can be modularly increased.

Nevertheless, many centralized circuit switched exchanges, large and small, remain in service and are quite unadaptable to provide the present and future data communication needs. As a result, the most common architecture for the provision of data communication services is the local area network (LAN). The LAN is, most frequently, a data network of the private premises network that is installed in addition to presently existing circuit switched exchanges (PABX's).

The problems of centralization are further compounded due to the plethora of different data peripherals presently available as well as those anticipated. Among the major problems are that present and future data peripherals have a variety of communication protocols and data transfer bit rates. In addition, system growth, whether due to increased use by existing subscribers or by an increase in subscribers or an increase in the services to be provided usually entails either a substantial reconfiguration of both the hardware and software or the provision of a new system.

SUMMARY OF THE INVENTION

Accordingly, it is one object of the present invention to provide a communication subsystem that overcomes the above recited difficulties.

This object is achieved, at least in part, by a communication subsystem having a distributed, masterless multi-microcomputer architecture Other objects and advantages will become apparent to those skilled in the art from the following detailed description read in conjunction with the appended claims and the drawings attached hereto.

DETAILED DESCRIPTION OF THE INVENTION

Figure 1:
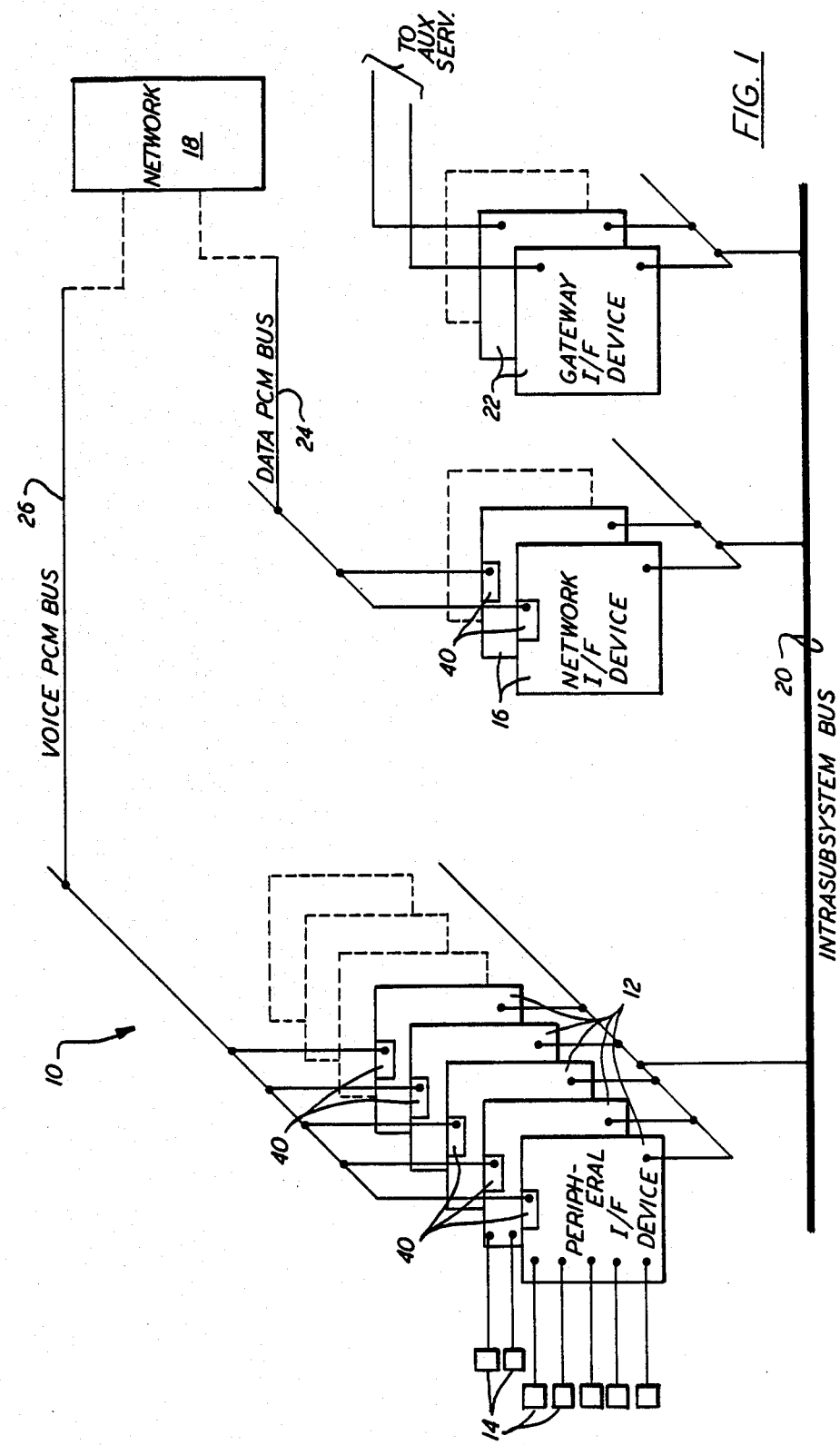
FIG. 1 is a block diagram of a communication subsystem embodying the principles of the present invention.

A communication subsystem, generally indicated at 10 in FIG. 1 and embodying the principles of the present invention, includes means 12 for interfacing with a plurality of peripherals 14, means 16 for interfacing with a networking medium 18 and means 20 for establishing data communication between and among the peripheral interface means 12 and the networking medium interfacing means 16. In addition, the subsystem 10 preferably includes means 22 for providing access to auxiliary services, the means 22 being interconnected with the data communication establishing means 20. Hence, means 22 is adapted to communicate data with the peripheral interface means 12 and/or the networking medium interfacing means 16. Further, the communication subsystem 10 includes a first communication medium 24 interconnecting the networking medium interface means 126 and the networking medium 18. In addition, in one embodiment, the subsystem 10 includes a second comunication medium 26 interconnecting the peripheral interfacing means 12 with the networking medium 18. As more fully explained below, the peripheral interfacing means 12 and the networking medium interfacing means 16 are substantially identical in the hardware implementation thereof. Further, the auxiliary services providing means 22 is, essentially, identical to the means 12 and 16.

Figure 2:
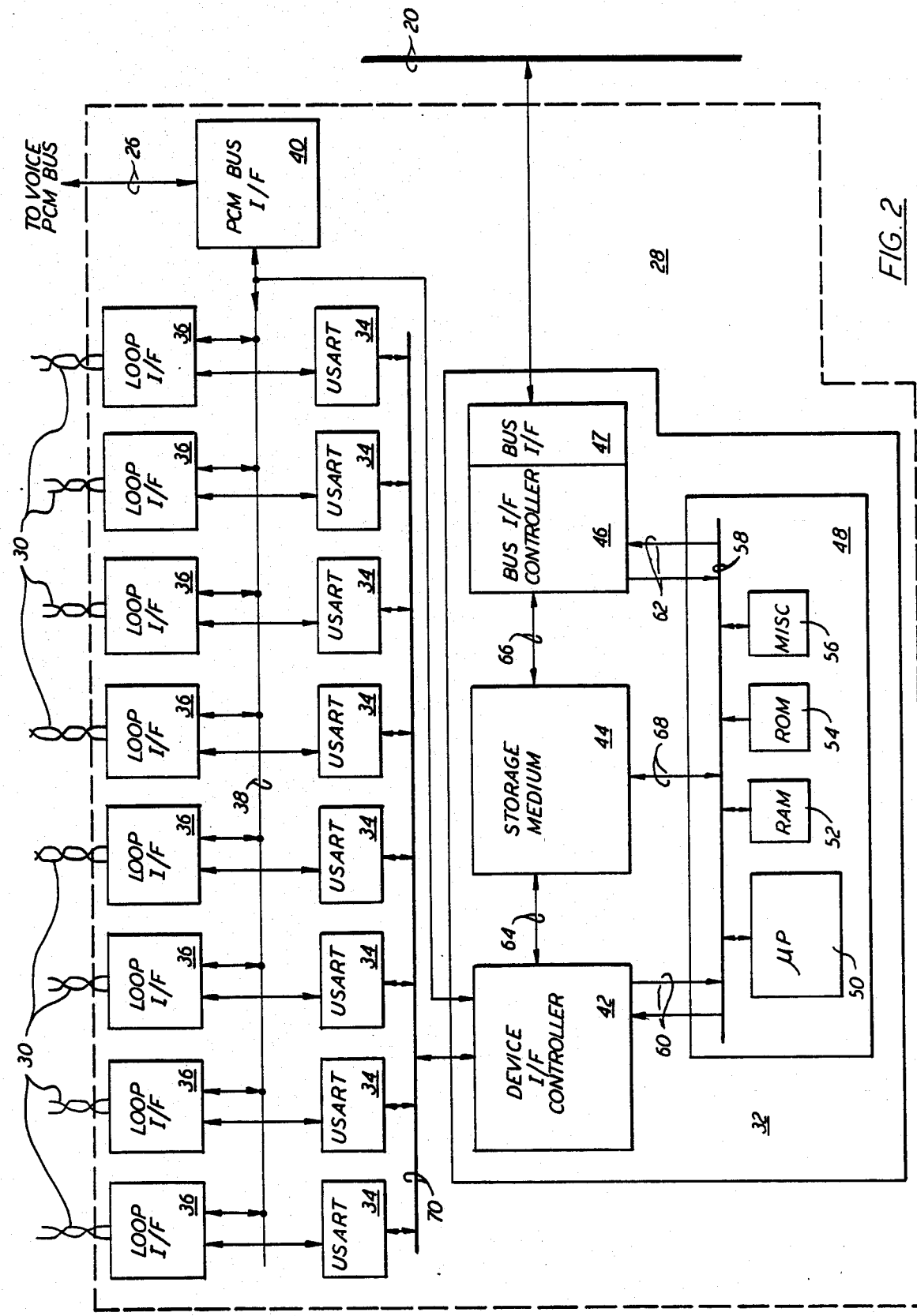
FIG. 2 is a block diagram of a peripheral interface device for use in the communication subsystem shown in FIG. 1.

In one preferred embodiment, the means 12 for interfacing with a plurality of peripherals 14 includes a plurality of substantially identical peripheral interface devices, one being generally indicated at 28 in FIG. 2, each of which is adapted to interface with voice and/or data peripherals via, for example, a plurality of twisted pairs of wires 30. Naturally, other peripherals may be interconnected via coaxial cables, fiber optic links or the like with the associated peripheral interface device 28 adapted therefor. As depicted. each peripheral interface device 28 includes a data transport controller 32 effectively interconnected between a plurality of universal synchronous/asynchronous receive/transmit (USART) devices 34 and the means 20, hereinafter referred to as the intrasubsystem bus. In this embodiment, each peripheral interface device 28 includes a subscriber loop interface 36 associated with each pair of twisted wires 30. Each subscriber loop interface 36, inter alia, exchanges data information with one of the USARTs 34 and exchanges voice information with a local voice bus 38 which voice bus 38 is interconnected with a pulse-coded-modulation (PCM) bus interface device 40.

In the preferred embodiment, the data transport controller 32 includes a device interface controller 42, a storage medium 44, a bus interface controller 46, with an associated bus interface 47, and a microcomputer 48. As shown, the microcomputer 48 preferably includes a microprocessor portion 50, a random-access-memory (RAM) 52, a read-only-memory (ROM) 54 and a miscellaneous program storage means 56. The microprocessor portion 50, the RAM 52, the ROM 54 and the means 56 are interconnected via a local microcomputer bus 58. In addition, in the preferred implementation, the device interface controller 42 and the bus interface controller 46 each have direct communication with the microcomputer 48 only via a set of interrupt/channel attention lines, 60 and 62, respectively. Further, the device interface controller 42 and the bus interface controller 46, effectively, independently interconnect with the storage medium 44 via separate address/data buses, 64 and 66, respectively. The microcomputer 48 interconnects with the storage medium via bus 68 which supports control, address and data exchanges therebetween.

One data transport controller 32 particularly adapted for use herein is described and discussed in U.S. patent application Ser. No. 705,457 entitled "Data Transport Control Apparatus" filed on even date herewith and assigned to the assignee hereof. Further, the device interface controller 42 is preferably of the type described and discussed in U.S. patent application Ser. No. 705,458 entitled "Device Interface Controller" filed on even data herewith and assigned to the assignee hereof. In addition, examples of an intrasubsystem bus 20 and associated bus interface 47 and bus interface controller 46 are described and discussed in U.S. patent application Ser. Nos. 670,682 and 670,701 both filed on Nov. 13, 1984 and assigned to the assignee hereof. The above identified applications are deemed incorporated herein by reference.

The intrasubsystem bus is, preferably, a masterless multiple-access bus with collision detection. In fact, as described and discussed in the referenced U.S. patent applications Ser. Nos. 670,682 and 670,701, the intrasubsystem bus 20 includes a data transport medium, a collision detection medium and a clock signal medium; the data transport medium being separate and distinct from the collision detection medium.

As discussed in the referenced U.S. patent application Ser. No. 705,458 entitled "Device Interface Controller" the device interface controller 42 is adapted to support a high speed bus 70 that interfaces with a plurality of data peripherals via the USART 34. In the instance that the subsystem 10 is employed in a data only environment each of the USARTs 34 would effectively, be directly interconnected to a respective one of the plurality of sets of twisted pairs of wires 30. Preferably, each USART 34 is implemented via one-half of a 8274 HDLC controller manufactured and marketed by Intel Corp. of Santa Clara, Calif.

Figure 3:
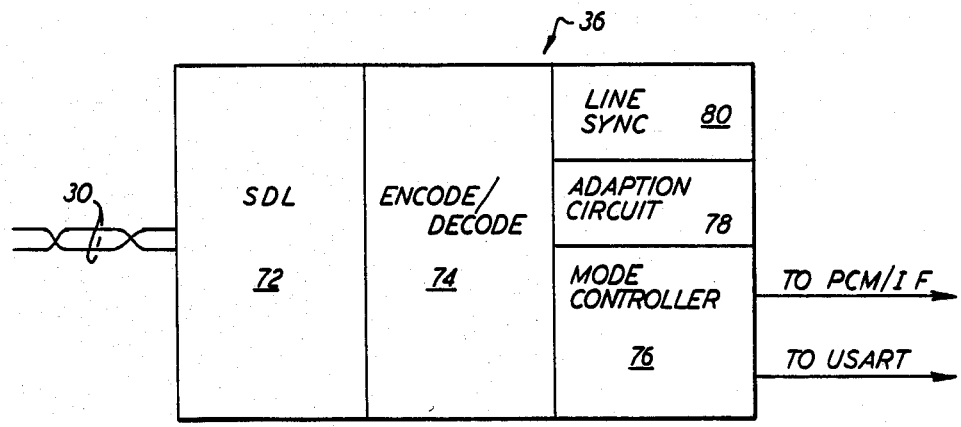
FIG. 3 is a block diagram of a loop interface device for use in the peripheral interface device show in FIG. 2.

In the preferred embodiment, however, the peripheral interface device 28 is adapted for both voice and data communication. In such an implementation, the loop interface devices 36, inter alia, multiplex/demultiplex the voice and data information establishing a voice path with voice bus 38 via the PCM bus interface 40. A block diagram of a preferred loop interface 36 is shown in FIG. 3 and includes a short digital loop 72, an encoder/decoder 74, a mode controller 76, a line adaptation circuit 78 and a line synchronization device 80 for synchronizing the line adaptation procedure. In one specific embodiment the short digital loop is of the type described and discussed in U.S. patent application Ser. No. 596,328 filed on Apr. 3, 1984 and assigned to the assignee hereof. The line synchronization device 80, preferably of the type described and discussed in U.S. patent application Ser. No. 705,459 entitled "Apparatus and Method for Use in Synchronizing Devices" filed on even date herewith and assigned to the assignee hereof. The encoder/decoder 74 and the mode controller 76 are implemented using conventional technology as discussed in U.S. patent application Ser. No. 705,462 entitled "System for Providing Data Services to a Circuit Switched Exchange" filed on evendate herewith and assigned to the assignee hereof. As discussed in the referenced U.S. patent application Ser. No. 705,459 entitled "Apparatus and Method for Use in Synchronizing Devices" the adaptation circuitry 78 can be selected for such circuits known in the art. the patent applications identified immediately above are deemed incorporated herein by reference.

One particular PCM bus interface 40, as discussed in the above-referenced patent application Ser. No. 705,462 entitled "System for Providing Data Services to a Circuit Switched Exchange", is described and discussed in U.S. patent application Ser. No. 682,228 filed on Dec. 14, 1984 entitled "Apparatus for Establishing communication Paths" and assigned to the assignee hereof. To the extent that the functions of the present PCM bus interface device are discussed and described in the device of U.S. patent application Ser. No. 682,228 that application is deemed fully incorporated herein by reference. As discussed therein the apparatus has a plurality of serial ports each terminating therewithin to a time-division-multiplexed bus and includes a switch, controlled by a switch controller, adapted to dynamically assign switch paths. One particular switch for providing dynamically assigned switch paths is described and discussed in U.S. patent application Ser. No. 682,033 filed on Dec. 14, 1984 and assigned to the assignee hereof. A switch controller for use in conjunction with the above referenced switch for providing dynamically assigned switch paths is described and discussed in U.S. patent application Ser. No. 682,030 filed on Dec. 14, 1984 and assigned to the assignee hereof. These patent applications are also deemed incorporated herein by reference.

As discussed in the last three referenced patent applications the PCM bus interface device 40 is adapted to receive voice information and establish paths for that voice information to the PCM bus 38 which bus 38, for example, can provide up to 30 full duplex.

Figure 4:
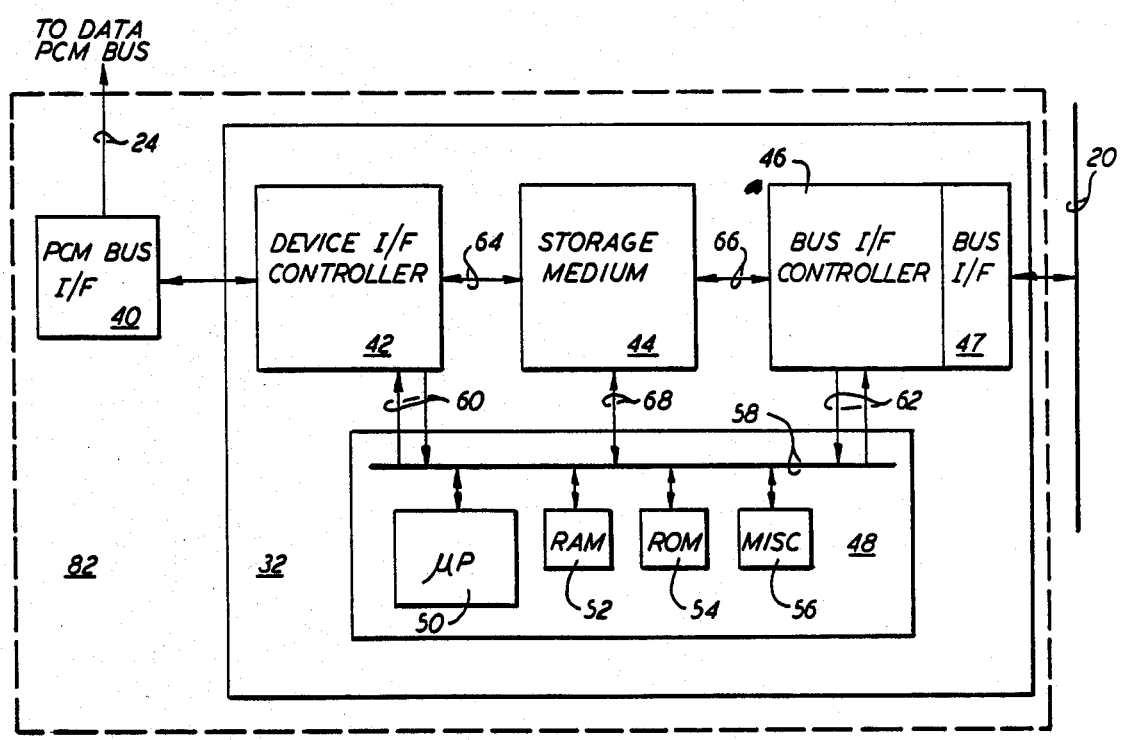
FIG. 4 is a block diagram of a network interface device for use in the communication subsystem shown in FIG. 1.
Figure 5:
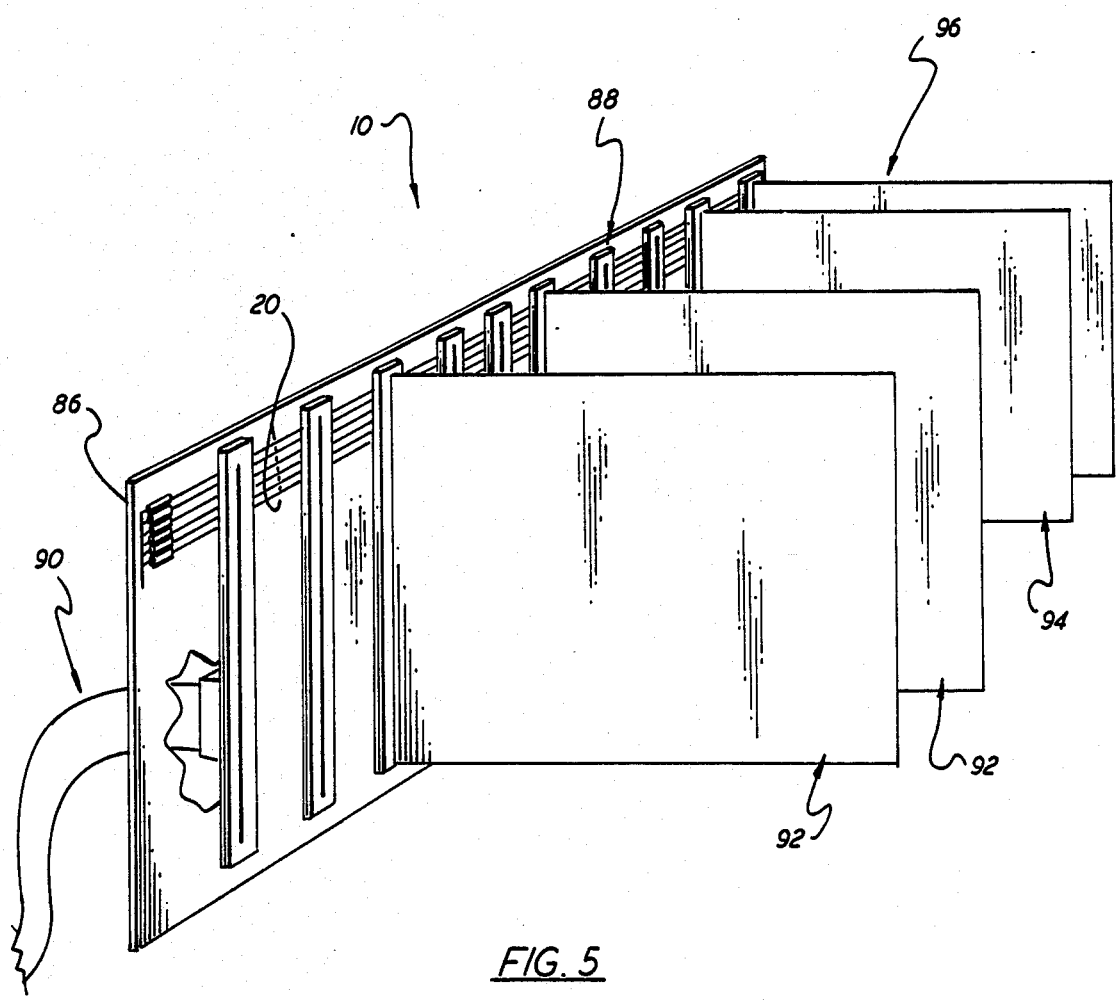
FIG. 5 is a pictorial of the communication subsystem shown in FIG. 1.

In the preferred embodiment, the means 16 for interfacing with a networking medium 18 includes at least one network interface device 82. A typical network interface device 82 is shown in the block diagram of FIG. 4 wherein previously assigned identification numerals are used to identify previously discussed elements. As shown, the network interface device 82 includes a data transport controller 32 interconnected between the intrasubsystem bus 20 and a PCM bus interface 40. The PCM bus interface 40 interfacing with the data PCM bus 24 that interconnects with the networking medium 18.

The data transport controller 32 is, in the hardware implementation thereof, substantially completely identical to the data transport controller 32 employed on each peripheral interface device 28. That is, the same data transport controller 32, as a module, is universally used in every peripheral interface device 28 and every network interface device 82 in the subsystem 10. As more fully discussed below the only difference between the data transport controllers 32 used on the peripheral interface devices 28 and the network interface devices 82 is the tasks assigned thereto by software programs downloaded thereinto.

Preferably, the means 22 for providing auxiliary services, such as, any known value added services including extended communication protocol conversions, includes a gateway interface device 84 having a substantially identical data transport controller 32. The specific design of such gateway interface devices 84, essentially, depends upon the auxiliary services or other networking to be provided and are programmed to execute the necessary communication, protocol conversion between the protocol of the bus 20 and that of the service provider.

In one particular implementation, the communication subsystem 10 includes a master printed circuit board assembly 86 having the intrasubsystem bus 20 formed thereon and having a plurality of printed circuit board connectors 88 affixed thereto. In such a structure, a first trunkline 90 is provided to interconnect with the peripherals 14 and a second trunkline, not shown, is provided to interconnect with the networking medium 18. Further, although not necessarily, each peripheral interface device 28 is implemented on a dedicated printed circuit board assembly 92, each network interface device 82 is implemented on a dedicated printed circuit board assembly 94 and each gateway interface device 84 is implemented on a single printed circuit board assembly 96. Hence, the subsystem 10 is modularly expandable with a minimal initial investment.

In operation, each peripheral interface device 28 interconnects with a plurality of peripherals 14 all of which peripherals 14 operate according to the same communication protocol. Further, due, in part, to the universal inclusion of a common data transport controller 32 or each device, 28, 82 and 84, the subsystem 10, and, preferably and network incorporating, such subsystems 10 includes a uniform protocol. Hence, by assigning each peripheral interface device 28 to peripherals 14 of a common communication protocol the number of communication protocol conversions, and the resultant traffic loading is reduced. One such technique of executing communication protocol conversions and the benefits derived therefrom is described and discussed in U.S. patent application Ser. No. 705,461 entitled "Apparatus and Method for Executing Communication Protocol Conversions" filed on even date herewith and assigned to the assignee hereof. This application is deemed incorporated herein by reference.

Further, the subsystem 10, as described above, is, essentially, a fully distributed multi-microcomputer architecture. That is, each data transport controller 32 is, inter alia, a microcomputer and, preferably, adapted to autonomously control all traffic thereacross. One particular implementation of providing distributed autonomous control throughout a system is described and discussed in U.S. patent application Ser. No. 705,465 entitled "Data Subsystem Traffic Control Apparatus and Method" filed on even date herewith and assigned to the assignee hereof. This application is deemed incorporated herein by reference. As a consequence, the subsystem 10 has the paramount advantage of avoiding catastrophic failure due to any one element failure and, in fact, is capable of providing continuous, albeit reduced, services in the event of multiple element failures.

The subsystem 10, primarily because of the use of a common data transport controller in addition to the modular multi-moicrocomputer distributed control architecture, is thus extremely versatile. For example, the subsystem 10 can be used as a common, or universal, data subsystem in a data communication network. In one such exemplary implementation the ITT SYSTEM 12 digital exchange can be used as the networking medium 18 hereof and the data PCM bus 24 of each subsystem 10 is directly interconnected thereto. One particular data communication network is described and discussed in U.S. patent application Ser. No. 705,363 entitled "Data Communication Network" filed on even date herewith and assigned to the assignee hereof. This application is deemed incorporated by reference herein.

The versatility and growth aspects of the communication subsystem 10 are such that the subsystem 10, with the temporary inclusion of a number of circuit switched exchange interface devices, can initially be implemented as a data services adjunct to, for example, a PABX, and expand modularly to eventually provide a full service voice/data system. an example of the use of such a data service adjunct is described and discussed in U.S. patent application Ser. No. 705,462 entitled "System for Providing Data Services to a Circuit Switched Exchange" and an example of the use for a full service voice/data system is described and discussed in U.S. patent application Ser. No. 705,460 entitled "Full Service Voice/Data System". Both of the immediately above referenced applications being filed on even date herewith, are assigned to the assignee hereof and incorporated herein by reference.

Although the present invention has been described with regard to a specific embodiment, it is understood that this is not a limitation and that other arrangements and configurations may be developed which are, nevertheless, within the scope and spirit hereof. Hence, the present invention is deemed limited only by the appended claims and the reasonable interpretation thereof.

What is claimed is:

1. A communication subsystem, said subsystem comprising:
- means for interfacing with a plurality of peripherals, said peripheral interfacing means including at least one peripheral interface device, each said peripheral interface devices interconnecting with a plurality of peripherals, each said peripheral interface device including means for multiplexing/demultiplexing voice and data information;
- means for interfacing with a networking medium, said networking medium interfacing means including at least one network interface device;
- means for establishing an intrasubsystem communication path between and among said peripheral interface devices and said network medium interface devices;
- a voice communication bus, said voice communication bus connecting to said peripheral interface devices whereby voice communication can be established with a network external to said subsystem;
- a data communication bus, said data communication bus connecting to said network interface devices whereby data communication can be established with a network external to said subsystem; and
- means, substantially uniformly distributed among said peripheral interface devices and said network interface devices, for controlling communication traffic within and across said subsystem.

2. Subsystem as claimed in claim 1 wherein said intrasubsystem communication path establishing means includes:
- a masterless multiple access contention bus with collision detection.

3. Subsystem as claimed in claim 2 wherein said masterless bus includes:
- a data transport medium; and
- a collision detection medium, said collision detection medium being distinct from said data transport medium.

4. Subsystem as claimed in claim 1 further comprising:
- means for providing access to auxiliary services.

5. Subsystem as claimed in claim 4 wherein said communication traffic controlling means is further distributed to said auxiliary services access means.

6. Subsystem as claimed in claim 1 wherein said communication traffic controlling means includes a plurality of data transport controllers.

7. Subsystem as claimed in claim 6 wherein each said data transport controller comprises:
- a device interface controller;
- a bus controller;
- a microcomputer, said microcomputer having direct connection with said device interface controller and said bus controller only for exchanging interrupt and channel attention signals therewith; and
- a storage medium, said storage medium being interconnected with device interface controller and said bus controller via separate dedicated address/data buses.

8. Subsystem as claimed in claim 6 wherein each said data transport controller associated with each said peripheral interface device includes:
- means for autonomously controlling all communication traffic of said associated peripheral interface device.

9. Subsystem as claimed in claim 8 wherein each said data transport controller associated with each said peripheral interface device includes:
- means for executing a single communication protocol conversion.

10. Subsystem as claimed in claim 6 wherein each said data transport controller associated with each said peripheral interface device includes:
- means for executing a single communication protocol conversion.

11. Subsystem as claimed in claim 6 wherein each said peripheral interface device includes:
- means for interfacing with a set of peripherals, each peripheral of said set operating according to the same communication protocol.

12. Subsystem as claimed in claim 6 further comprising:
- means, associated with each said peripheral interface device, for interfacing with a plurality of subscriber lines.

13. Subsystem as claimed in claim 6 wherein each said data transport controller associated with each said network interface device includes:
- means for autonomously controlling all communication traffic of said associated network interface device.

14. Subsystem as claimed in claim 6 wherein each said data transport controller includes:
- means for autonomously controlling all communication traffic of said interface device associated therewith.

* * * * *